(12) United States Patent  (10) Patent No.: US 7,557,538 B2
Yau et al.  (45) Date of Patent: *Jul. 7, 2009

(54) INTELLIGENT SERIAL BATTERY CHARGER

(75) Inventors: Kwok Wong Yau, Hong Kong SAR (CN); Yiu Cheung Li, Hong Kong SAR (CN); Long Bai, Shenzhen (CN)

(73) Assignee: GPE International Limited, Hong Kong SAR (CN)

( * ) Notice: Subject to any disclaimer, the term of this patent is extended or adjusted under 35 U.S.C. 154(b) by 545 days.

This patent is subject to a terminal disclaimer.

(21) Appl. No.: 10/929,789

(22) Filed: Aug. 31, 2004

(65) Prior Publication Data

US 2005/0083016 A1    Apr. 21, 2005

Related U.S. Application Data

(63) Continuation-in-part of application No. 10/383,613, filed on Mar. 10, 2003, now Pat. No. 6,822,423, which is a continuation-in-part of application No. 09/971,593, filed on Oct. 9, 2001, now Pat. No. 6,580,249.

(30) Foreign Application Priority Data

Sep. 3, 2001    (CN)    ............................... 01 1 06195

(51) Int. Cl.
    *H02J 7/00*    (2006.01)
(52) U.S. Cl. ....................................... 320/116; 320/122
(58) Field of Classification Search .................. 320/116, 320/119, 122
    See application file for complete search history.

(56) References Cited

U.S. PATENT DOCUMENTS

| 4,303,877 | A |   | 12/1981 | Meinhold |
|---|---|---|---|---|
| 4,626,764 | A |   | 12/1986 | Weinhardt |
| 4,691,157 | A |   | 9/1987 | McDermott |
| 4,719,401 | A |   | 1/1988 | Altmejd |
| 5,099,188 | A |   | 3/1992 | Birnbreier et al. |
| 5,270,635 | A |   | 12/1993 | Hoffman et al. |
| 5,650,240 | A | * | 7/1997 | Rogers ........................ 429/61 |
| 5,675,233 | A |   | 10/1997 | Kaneko et al. |
| 5,744,936 | A |   | 4/1998 | Kawakami |
| 5,773,962 | A |   | 6/1998 | Nor |
| 5,804,944 | A |   | 9/1998 | Alberkrack et al. |
| 5,850,136 | A | * | 12/1998 | Kaneko ..................... 320/119 |

(Continued)

FOREIGN PATENT DOCUMENTS

CN    1138768 A    12/1996

(Continued)

OTHER PUBLICATIONS

Maxim Integrated Products, *"Maxim NiCd/NiMH Battery Fast-Charge Controllers"*, Jan. 1997, 18 pps.

*Primary Examiner*—Edward Tso
*Assistant Examiner*—Alexis Boateng
(74) *Attorney, Agent, or Firm*—Buchanan Ingersoll & Rooney PC

(57) ABSTRACT

A fast battery charger in which each one of the battery charging sections comprises a charging branch and a bypassing branch, the battery charger is provided with enhanced charging monitory and control circuitry and method for performance elevation with minimal additional hardware overhead.

30 Claims, 7 Drawing Sheets

U.S. PATENT DOCUMENTS

| | | |
|---|---|---|
| 5,923,150 A | 7/1999 | Umetsu |
| 5,998,967 A | 12/1999 | Umeki et al. |
| 6,025,696 A | 2/2000 | Lenhart et al. |
| 6,034,506 A | 3/2000 | Hall |
| 6,046,514 A | 4/2000 | Rouillard et al. |
| 6,121,752 A | 9/2000 | Kitahara et al. |
| 6,211,650 B1 | 4/2001 | Mumaw et al. |
| 6,265,846 B1 | 7/2001 | Flechsig et al. |
| 6,271,646 B1 | 8/2001 | Evers et al. |
| 6,329,792 B1 | 12/2001 | Dunn |
| 6,580,249 B2 * | 6/2003 | Yau et al. .................... 320/122 |
| 6,822,423 B2 * | 11/2004 | Yau et al. .................... 320/122 |
| 2005/0174094 A1 * | 8/2005 | Purdy et al. ................. 320/134 |

FOREIGN PATENT DOCUMENTS

| | | |
|---|---|---|
| CN | 1164771 A | 11/1997 |
| CN | 2384357 Y | 6/2000 |
| DE | 19705192 | 10/1997 |
| DE | 19705192 A1 | 10/1997 |
| EP | 0798841 A2 | 10/1997 |
| JP | 7-163060 | 6/1995 |

\* cited by examiner

INTELLIGENT SERIAL BATTERY CHARGER

This application is a continuation-in-part application of U.S. Ser. No. 10/383,613 filed 10 Mar. 2003 and published as 2003/0160593 on Aug. 28, 2003, which is in turn a continuation-in-part application of U.S. Ser. No. 09/971,593 filed on 9 Oct. 2001, now U.S. Pat. No. 6,580,249.

FIELD OF THE INVENTION

The present invention relates to battery chargers and, more particularly, to battery chargers for charging a plurality of rechargeable batteries individually. More specifically, although not solely limited thereto, this invention relates to fast battery chargers having a plurality of serially connected battery charging sections.

BACKGROUND OF THE INVENTION

Rechargeable batteries are widely used in portable or mobile applications, devices and/or appliances and back-up power supplies. Cellular and cordless telephones, remote repeaters, remote control units, remote sensors, portable lighting devices, portable radios, portable drills, digital cameras are common examples of such applications, devices and appliances. Rechargeable batteries are preferred over disposable batteries because they have a longer operating life, are more environmental friendly and offer longer-term cost savings. For remote applications, rechargeable batteries are probably the only practical choice.

In general, rechargeable batteries may comprise a single battery cell or a plurality of battery cells connected in series. The voltage of each battery cell is typically between 1-2 volts and more commonly in the region of 1.2 to 1.5 volts. For example, a typical dry rechargeable Nickel Metal Hydride (NiMH) battery cell has a rated voltage of 1.2 volt.

As a result of improvements in battery technologies and the increasing demand for batteries with a higher power density to feed high drain rate devices such as digital cameras, standard-sized batteries with enhanced capacities are available. For example, dry rechargeable AA batteries with a capacity of over 2000 mAH and above are now commonly available and further enhancement in battery power density can be expected. The GP® 2100 series NiMH batteries from the Gold Peak® Group are an example of high power density rechargeable batteries for general application.

Rechargeable batteries require repeated charging to provide renewed energy for repeated discharging and battery chargers are provided for such purposes. A typical battery charger comprises a charging power source and battery charging circuitry. The charging power source usually comprises either a constant current source or a constant voltage source. Battery chargers commonly utilise high frequency pulsed charging current with a relatively high current rate for fast charging. For example, a 4C current source is used for a 15-minute fast battery charger. The constant voltage or constant current source usually comprises a switch mode power supply ("SMPS") which converts the 50 or 60 Hz AC mains power into a charging power of a high frequency, for example, by chopping at between 10 kHz to 100 kHz, although a chopping frequency of above 20 kHz is preferred to mitigate audible noise.

In many applications using batteries, the power supply of a device is formed by a connection of a plurality of batteries, for example standard sized batteries such as A, AA, AAA, C, D or 9-volt batteries, and the operating voltage is usually significantly less than the AC mains supply voltage. For example, many portable devices are powered by 4 to 6 standard sized batteries and the maximum voltage is usually less than 9 volts. Typically, the charging power source is usually conveniently obtained from the AC mains. To provide a suitable voltage for battery charging as well as safety isolation to protect users from electric shock and to comply with various safety regulations and standards, isolation transformers are usually included in a battery charger and concealed within an insulated housing. Of course, the reference to standard sized batteries is for example only and batteries of new sizes and/or types will become "standard-sized batteries" as demands justify. For example, lithium-ion batteries may be available in standard sizes.

The widespread use of rechargeable batteries, especially in consumer applications, also sees an increasing demand on fast battery chargers. The term "fast battery chargers" is commonly understood by persons skilled in the art as referring to battery chargers which are capable of charging an empty battery to its fully charged state within an hour or less. A fast battery charger which are designed to fully charge a battery to its fully charged state in one hour is commonly known as a "1C" charger and such a battery charger is equipped with a "1C" current source or a current source with a "1C" rating. For example, for a rechargeable battery of 2,000 mAH capacity, the 1C charging current rate is 2A and the 2C charging current rate is 4A and so forth. In the exemplary case of a 15-minute fast battery charger designed for AA-sized batteries of 2,000 mAH capacity, a charging current of 8 Amperes will be required for each battery charging section. If a parallel-type battery charger topology is adapted so that a plurality of battery charging sections are connected in parallel to a charging power source, the total charging current will be multiplied by the number of parallel charging sections. Thus, for a battery charger with, say, four charging sections, a charging current source of 32 Amperes rating is required and so forth. This phenomenon would mean that the parallel charger topology is less attractive for fast battery chargers, especially when the charging speeds, battery capacities and charging section increase further.

Hence, it will be apparent that fast battery chargers, especially those for charging small voltage re-chargeable batteries of voltage rating of about 1.2-2V, are preferably configured as the serial-type charger with a plurality of battery charging sections so that the batteries can be charged in series. Otherwise, a power supply with a very large current supply rating will be required and this may be very bulky and costly.

On the other hand, a conventional serial battery charger design implies that the same charging current will flow through each of the connected battery charging sections. This may create difficulty in many circumstances. For example, it may be necessary to remove or isolate a battery from a charging section when charging is completed or because the battery is defective. This may happen while other batteries in the charger are still under charging conditions. When a battery is removed from a charging section, charging will be interrupted due to the series connection of the battery charging sections unless alternative paths are provided. Similar problems also arise if rechargeable batteries of different capacities are charged together or good batteries are mixed with bad or wrong ones. For example, when a battery of a smaller capacity has been fully charged, there is a good chance that a battery of a larger capacity still requires charging. For ordinary serial chargers with less sophisticated monitoring and control circuits, the batteries will be indiscriminately charged. Consequently, overheating, battery damage or even explosion may result. On the other hand, for serial battery chargers with more sophisticated charging conditions monitoring and control circuits, the battery charger may be shut down once any one of the batteries has been fully charged. This is unsatisfactory as the remaining batteries may still require further charging. In many battery chargers, it is known that, when power supply to the battery charger is turned off, a reverse leakage current may flow from the battery to the charger or the peripheral circuitry. Such a reverse leakage current may cause reverse charging of individual batteries by other batteries that are connected in a serial charger. This is clearly undesirable since batteries may be drained and the charger may be damaged.

Hence, it will be apparent that several requirements need to be overcome simultaneously by a serial battery charger if shortcomings of conventional serial battery chargers are to be alleviated. Firstly, in order to prevent adverse reverse current leakage or current discharge from a battery, a blocking device having a high reverse impedance needs to be inserted in series with a battery in a battery charging section. Secondly, that serial blocking device must have a very low-impedance for a forward current which flows into the battery for battery charging. On the other hand, if the blocking device has a low forward impedance when the bypassing switch has been actuated (which usually occurs when there is still power supply to the battery charging terminals), that low-impedance blocking device will compete with the bypassing switch for the supplied current and, as a result, adverse charging current will keep flowing into the batteries. In addition, that blocking device must have a high-impedance when the bypassing switch has been activated, otherwise, a large and un-desirable current will flow in a current loop comprising the battery, the blocking device and the bypassing switch. Serial chargers meeting the above requirements have been disclosed in the parent applications, namely, U.S. Pat. No. 6,580,249 (under Re-issue process) and U.S. patent application Ser. No. 10/383,613 published as US 2003/0160593, which are incorporated herein fully in their entirety by reference.

As fast battery chargers are expected to become faster and faster, for example, a fast charger with a charging current source of 4C is already available, a complete battery charging cycle time is expected to reduce further and a full charging cycle of less than 15 minutes can be expected in the short near future. To cope with this trend of development, fast and more responsive battery charging, monitoring and control circuitry is needed to timely terminate battery charging to alleviate the risks of adverse consequence due to overcharging by a large current source. Accordingly, fast battery chargers with improved battery charging control and monitoring circuitry and methods, which are faster and more responsive, are desirable and beneficial.

OBJECT OF THE INVENTION

Accordingly, it is an object of the present invention to provide improved battery charging control and monitoring methods as well as circuitry for fast battery chargers and fast battery chargers, especially battery chargers for charging the aforesaid standard-sized batteries individually, utilising same. It is highly desirable if the aforesaid object can be met without requiring unduly complicated hardware circuitry in addition to the essential circuitry of the aforesaid improved serial chargers so that the public can enjoy added benefits at minimal additional hardware overheads. At a minimum, it is an object of the present invention to provide the public with a choice of serial battery chargers with the charging control and monitoring methods and/or circuitry as described herein.

SUMMARY OF THE INVENTION

According to the present invention, there is provided charging monitoring and control means and methods for fast battery chargers and fast battery chargers incorporating same.

According to a first aspect of the invention, there is provided control means for a serial battery charger, said serial battery charger comprising a charging current source and a plurality of battery charging sections connected in series, each said battery charging section comprising first and second parallel branches, said first parallel branch comprising a bypassing switch which forms a low impedance bypassing shunt across said second parallel branch when actuated, said second parallel branch comprising an electronic isolation means connected in series with a pair of battery contact terminals for connecting a battery to said battery charging section for battery charging, said electronics isolation means when actuated substantially isolating said battery from said battery charging section, said electronic isolation means providing a low-impedance connection to said battery when de-actuated, wherein said control means repetitively actuates the bypassing switches of said plurality of battery charging sections for battery voltage measurements when batteries connected to said battery charging sections are still under battery charging conditions.

Preferably, said control means repetitively actuates said bypassing switches of said battery charging sections at a high frequency for battery voltage measurements.

Preferably, said control means causes actuation of the bypassing switch of a battery charging section in order to isolate a battery from said battery charging section battery to terminate charging of said battery.

Preferably, said control means actuates the bypassing switches of all the battery charging sections downstream of a battery charging section when the voltage of a battery connected to said battery charging section is measured, the actuation of said downstream bypassing switches connects the negative terminal of said battery to the reference ground of said battery charger.

Preferably, said battery charger comprises voltage measuring means for measuring battery voltages, each said voltages measuring means is connected to the positive battery terminal of a battery charging section, wherein, upon actuation of the bypassing switches downstream of a selected battery charging section, the voltage appearing at said positive battery terminal of said battery charging section is the voltage of said battery with reference to the ground of said battery charger.

Preferably, the open-circuit voltage of a battery connected to a selected battery charging section is measured when the bypassing switch of said battery charging section has been actuated.

Preferably, said battery charger comprises voltage measuring means for measuring battery voltages, each said voltages measuring means is connected to the positive battery terminal of a battery charging section, wherein, upon actuation of the bypassing switches downstream to a battery charging the voltage appearing at said positive battery terminal of said battery charging section is the voltage of said battery with reference to the ground of said battery charger.

Preferably, said battery contacts of said second parallel branches are downstream of said isolation means and the negative battery contact terminal of a battery charging section is in common with the common node of the first and second parallel.

Preferably, wherein steps a) and b) are repetitively performed at a high frequency.

Preferably, steps a) and b) are repeated by actuating said bypassing switches at a frequency of about between 20-45 kHz.

Preferably, said isolation means being upstream of said battery contact terminals, the method further comprising the step of actuating the bypassing switches of all battery charging sections downstream of a battery charging section in which the voltage of a battery connected to said battery charging section is being measured.

Preferably, batteries connected to said downstream battery charging sections being electrically isolated from the charging current source upon actuation of said bypassing switches of said downstream battery charging sections, the actuation of said bypassing switches of said downstream battery charging sections simultaneously connecting the negative terminals of said batteries to the reference ground of said battery charger so that the voltage appearing at the positive terminals of the batteries connected to said downstream battery charging sections are the voltage of said batteries.

According to another aspect of the invention, there is provided a method of monitoring and controlling the charging of batteries for a serial battery charger, said method comprising the steps:
(a) actuating the bypassing switches of said battery sections when batteries connected to said battery charging sections are still under battery charging conditions,
(b) measuring the voltages of said batteries,
(c) repeating steps a) and b) above until a battery is to be removed from the charging process,
(d) isolating said battery from the said battery charging section to which said battery is connected and from the charging current source by actuating the bypassing switch of the battery charging section connected to said battery when the condition of said battery to be isolated fulfils a predetermined criterion.

BRIEF DESCRIPTION OF THE DRAWINGS

Preferred embodiments of the present invention will be explained in further detail by way of example and with reference to the accompanying drawings. In which.

DETAILED DESCRIPTION OF THE PREFERRED EMBODIMENT

Figure 1:
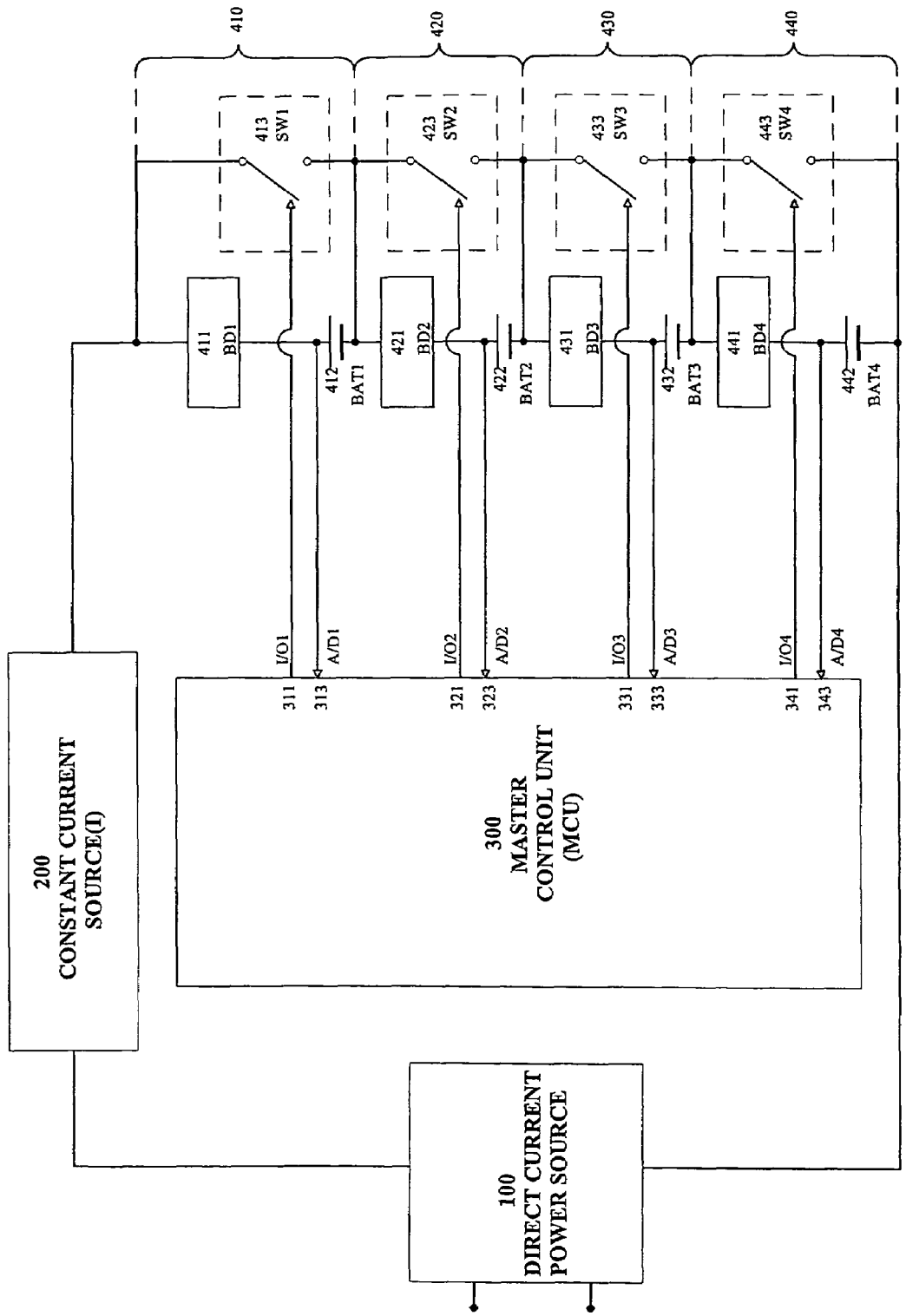
FIG. 1 is a general block circuit diagram showing a first example of a battery charger of the present invention.

Referring to FIG. 1, there is shown a block diagram of an intelligent serial battery charger as an example of the present invention. The battery charger comprises a direct current (DC) power source (100) as a main power supply, a constant current/voltage source (200), a micro-controller unit (300) as an example of control means or control device, and a plurality of battery charging sections (410, 420, 430 and 440) connected in series. The serially connected battery charging sections are connected to the positive and negative terminals of the direct current power source (100) in order to obtain DC power of the correct polarity.

The constant current source may comprise a switch-mode power supply (SMPS) with a chopping frequency of, for example, between 10-100 kHz, and preferably at 20-50 kHz. A high chopping frequency of above 20 kHz is preferred to mitigate possible audible noise while the upper frequency limit is to allow a sufficient time, for example, 2 ms, for stable battery voltage measurements to be explained below. Of course, the upper chopping frequency limit can be upwardly adjusted if the frequency characteristics of the combination of the micro-controller, the bypassing switch, the electronic isolation means and the battery cell permit.

Each of the battery charging sections (410, 420, 430 and 440) comprises first and second parallel branches. The first parallel branch comprises an electronic controllable bypassing switch (413, 423, 433, 443) which forms a low impedance shunt across the second parallel branch when actuated by the control means. The second parallel branch comprises an electronic isolation means (411, 421, 431, 441) which is connected in series with the positive and negative battery contact terminals of their respective battery charging sections for receiving a battery to be charged. In the present example, the electronic isolation means rare upstream of the battery contact terminals of the same parallel branches. As shown in the Figure, the bypassing switch of the first parallel branch is connected in parallel with the serial connection of the battery terminals and the electronic isolation device of the second parallel branch. An exemplary bypassing switch comprises a three-terminal device such as a MOSFET in which the impedance across two of its terminals is controllable by a third terminal.

The electronic isolation means has the following characteristics. Firstly, it has a very low-impedance when the battery is being charged. This is necessary to mitigate power loss and heat dissipation across the electronic isolation means when a forward current flows into the battery. Secondly, it has a very high-impedance when there is no power supply from the charger or when the voltage at the battery contact terminals exceeds that of the battery charging section, if the apparatus is to function only as a charger but not a stored energy source. This will prevent adverse current discharge or reverse current flow from the battery to prevent draining of the batteries when there is no power supply from the direct current power source (100) or when a wrong battery is inserted. Thirdly, the electronic isolation means will have a very high-impedance once the bypassing switch has been actuated (turned on). This will mitigate the risks of the formation of a large-current current loop, which comprises the battery, the electronic isolation means and the bypassing switch, which may cause circuit burn-outs.

The bypassing switch and the electronic isolation means of a battery charging section are selected and configured so that when the bypassing switch is actuated, a very low-impedance bypassing shunt is formed across the second parallel branch and, at the same time, the electronic isolation means is also actuated so that a battery connected to the battery charging section is substantially isolated from the charging current due to the very high-impedance of the actuated electronic isolation means.

In addition to providing a bypassing shunt for the main charging current as and when necessary, the pair of electronically controlled bypassing switch and electronic isolation means is also adapted for high frequency and repeated switching. High frequency and repeated switching facilitates high frequency and repeated electrical parameter measurements to be taken across the battery terminals so that the battery charging conditions can be continuously monitored at short intervals while battery charging is in progress. Such high frequency and repeated measurements are especially beneficial for fast battery chargers since the charging current can be substantial and a timely removal of a battery from the charging current is desirable for safer charger operation and for user protection. An example of how the electrical parameters of the batteries can be taken while battery charging is in progress will be explained below.

For example, when the voltage of the battery (422), which is connected to the second serial charging section (420), is to be measured while battery charging is still in progress, the micro-controller (300) sends out electronic control signals through its I/O ports to the control terminals of the three-terminal bypassing switches of the bypassing switches downstream of the second battery charging section and turns on the downstream bypassing switches (433, 443). As the impedance across the two other terminals of the bypassing switches (433, 443) is very low once actuated and since the battery contact terminals of the battery charging section are downstream of the electronic isolation means (421), the actuation of those downstream bypassing switches (433 and 443) connects the negative battery contact terminal (and therefore the negative battery terminal) of the second battery charging section to the reference ground of the battery charger. Consequently the voltage appearing at the positive battery contact terminal of the second battery charging section is the voltage of the battery (422) and the output to the A/D port (323) of the micro-controller will provide the useful voltage information of the battery (422) alone.

Furthermore, the batteries (432, 442) connected to the third and fourth downstream battery charging sections (430, 440) are also isolated from their respective battery charging sections upon actuation of the corresponding bypassing switches (433, 443) and also with their respective negative terminals connected to the reference ground of the battery charger. Consequently, the voltages appearing at the positive battery contact terminals of the third and fourth battery charging sections are respectively the voltages of the third (432) and fourth (442) batteries and the outputs to the corresponding A/D ports (333, 343) of the micro-controller provide the respective voltage information of the individual batteries (432, 442).

Likewise, when the voltage of the first battery (412) is to be measured, the bypassing switches of all the other downstream battery charging sections (that is, 420, 430, 440) are actuated and the voltage appearing at the corresponding positive battery terminals are the voltages of the respective individual voltages, since the batteries connected to the downstream battery charging sections are all isolated from their respective charging sections with their respective negative terminals connected to the reference ground of the battery charger as well consequently. If the corresponding bypassing switch is not actuated, open-circuit voltage of the battery can be measured by momentarily opening the circuit connection between the current source (200) and the battery charging sections. Of course, the open-circuit voltage of the individual batteries can be measured when the bypassing switches of their respective battery charging sections have been actuated. It will be appreciated that when all the bypassing switches (413, 423, 433 & 443) have been actuated, the micro-controller can read the open-circuit voltages of all the batteries individually from the positive terminal outputs which are connected to the A/D ports (313, 323, 333, 343) without having to sequentially actuate the bypassing the switches.

After measurements have been taken, the micro-controller again sends out control signals to the bypassing switches and return them to the non-actuated state, as a result, the impedance across the two other terminals of the bypassing switches will return to a very high state and the charging current will flow again into the second parallel branch to continue battery charging. Of course, the above principles of operation and battery voltage measurements will apply to other battery charging sections without loss of generality.

Naturally, the voltage of an individual battery (for example 422) can be measured after the corresponding bypassing switch has been activated and without actuation of the downstream bypassing switches. However, additional analogue-digital converters and calculation will be needed to measure the potential difference across the two battery terminals since the negative battery terminal is not at the reference ground potential of the battery charger. To ensure accurate measurement of the open-circuit parameters, it is highly desirable that when the bypassing switches are closed (actuated), no current flows in or out of the batteries the corresponding bypassing switches of which have been activated, otherwise, the open-circuit readings may not be accurate.

To prevent adverse flow of current from the power source into the battery when the bypassing switch is closed, the impedance of the electronic isolation means (411, 421, 431, 441) should be significantly higher than that of the bypassing switch (413, 423, 433, 443) when the corresponding bypassing switch has been actuated. On the other hand, the electronic isolation means should have a very low-impedance where there is current supply from the charger and when the bypassing switch is opened so that the charging current will flow entirely into the battery via the electronic isolation means for battery charging, while minimizing power loss across the non-actuated electronic isolation means.

A MOSFET is an example of an electronically controllable switch which has such suitable high and low-impedance states. In general, when a suitable gate voltage is applied to a MOSFET, the drain-source terminals of the MOSFET will become conducting with a very low-impedance. On the other hand, if a different gate voltage is applied, the drain-source terminals of the MOSFET will have a very high-impedance and become non-conducting. A MOSFET switch with a relatively high bandwidth is selected as a bypassing switch so that the bypassing switch can be turned on and off many times within a short period of time. Such repeated switching is required in order to take all the necessary open circuit measurements and readings within a short time frame compatible with the operation of a fast charger and since battery charging conditions need to be continuously monitored, for example, to detect—Δv, zero slope or other important parameters. The high bandwidth is also preferred in order to take responsive actions once any abnormality of a battery is observed and in order to minimise any noticeable disruption to the other charging sections when a battery is removed from the charger. Of course, other electronic devices exhibiting similar electronic characteristics may also be used as alternatives.

Figure 2:
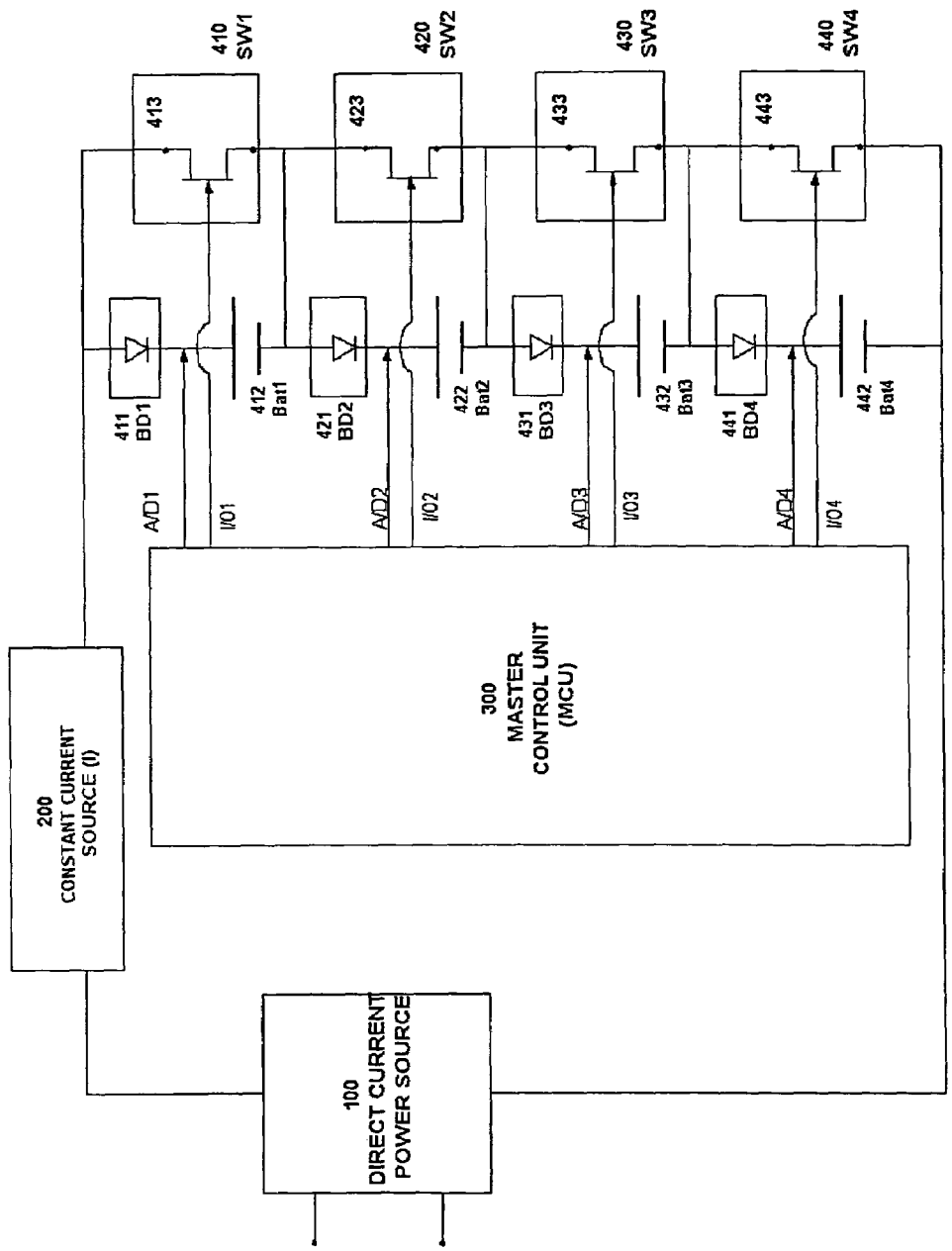
FIG. 2 is a block diagram showing a first preferred embodiment of the exemplary battery charger of FIG. 1.

Referring to FIGS. 1 & 2, there is shown a first preferred embodiment of the present invention in which the electronic isolation means is a one-way electronic device comprising a diode and a MOSFET is used as a bypassing switch. The diode is connected in series with and upstream of the battery contact terminals in the manner as shown in FIG. 2 so that charging current can flow into the battery through a low-impedance path while reverse current flow is blocked. When the MOSFET bypassing switch (413, etc.) is turned on, the drain-source impedance becomes very low and the drain-source voltage is therefore also very low which is typically in the region of 0.2 volt. Since such a low voltage across the drain and source terminals is far from the turn-on voltage of the diode which is typically in the region of 0.6 volt, the diode becomes a high-impedance blocking device which prevents current from flowing into the battery. By the synergetic utilization of the combined characteristics of the two devices, namely, the low drain-source voltage of about 0.2 volt when a MOSFET is turned on and the high turn-on voltage of about 0.6 volt for a diode, a battery charger or battery charging section satisfying the afore-said conflicting requirements can be provided.

Figure 3:
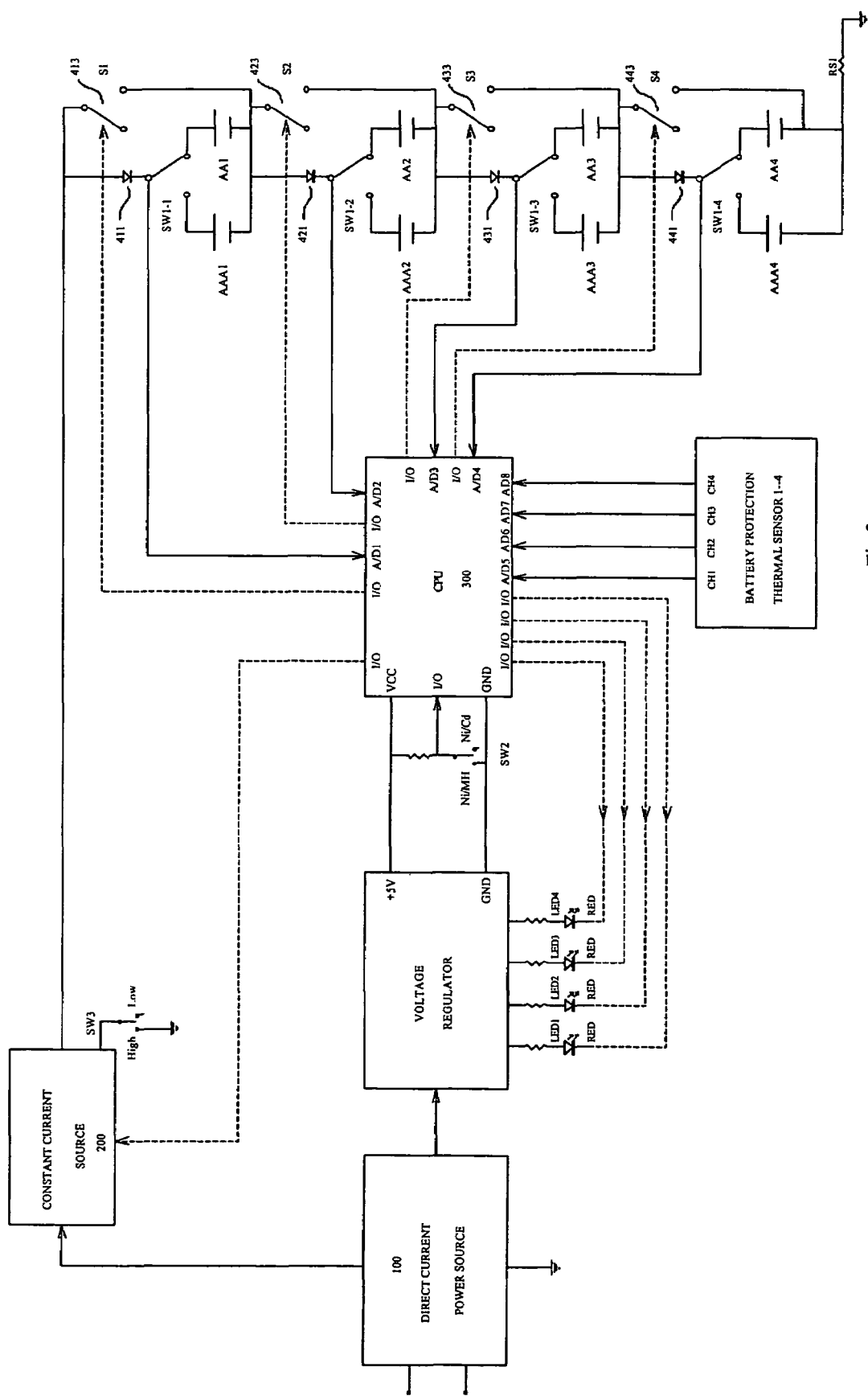
FIG. 3 is a general circuit diagram showing in more detail the connection particulars of the serial battery charger of FIGS. 1 and 2.

Referring to FIG. 3, there is shown a schematic diagram showing in more details the connections between the power source (100), the current source (200), the CPU (300) and the serially connected battery charging sections (410, 420, 430, 440). Each of the battery charging section includes an electronic isolation mean which acts as a blocking device (411, 421, 431, 441) and which prevents reverse flow of current out of the battery as well as providing a high-impedance isolation of the battery terminals when the low-impedance bypassing switch (413, 423, 433, 443) has been turned on. In this specific embodiment, each charging section is provided with battery receptacles for selectively and alternatively charging a AAA or a AA battery.

Figure 4A:
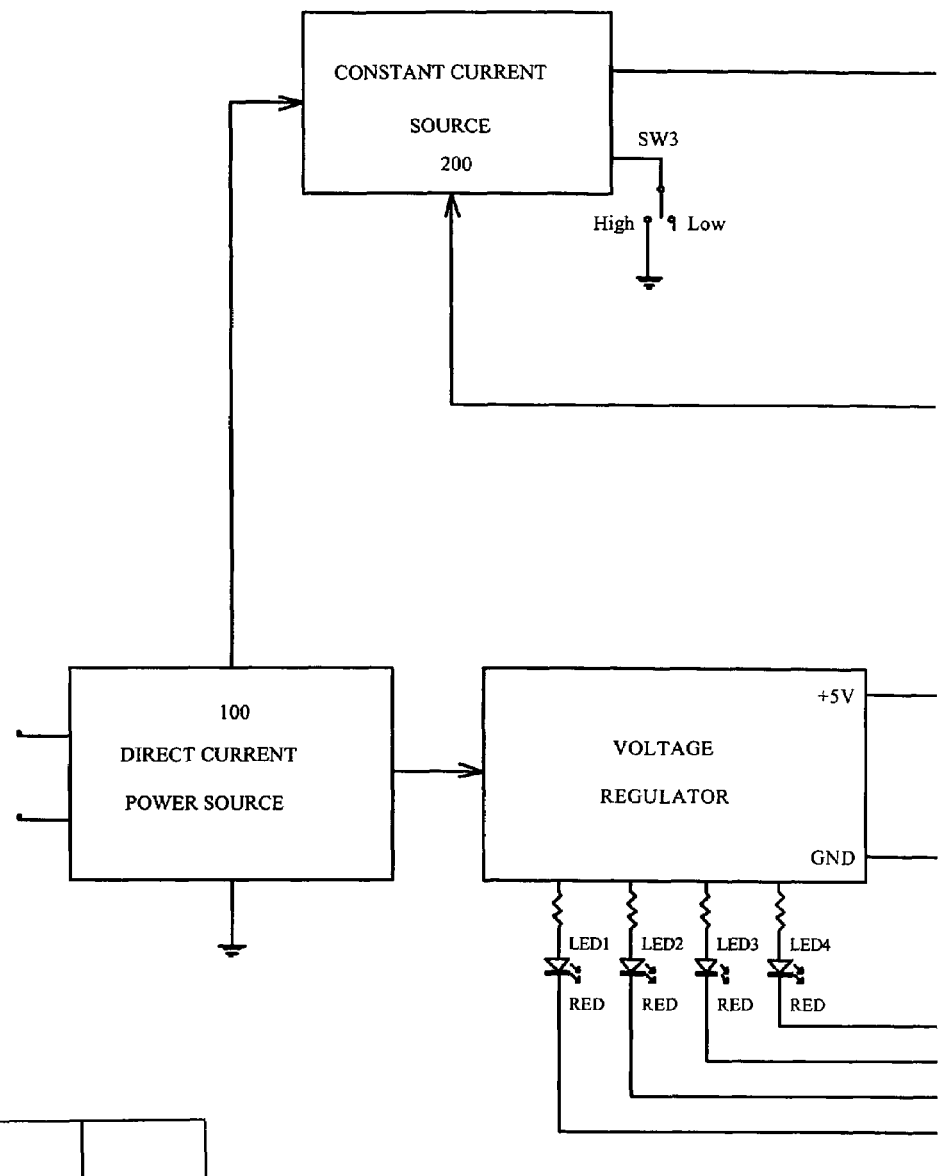
FIG. 4 is a general circuit diagram showing in more detail the hardware connection of the fast serial battery charger for FIGS. 2 and 3.
Figure 4B:
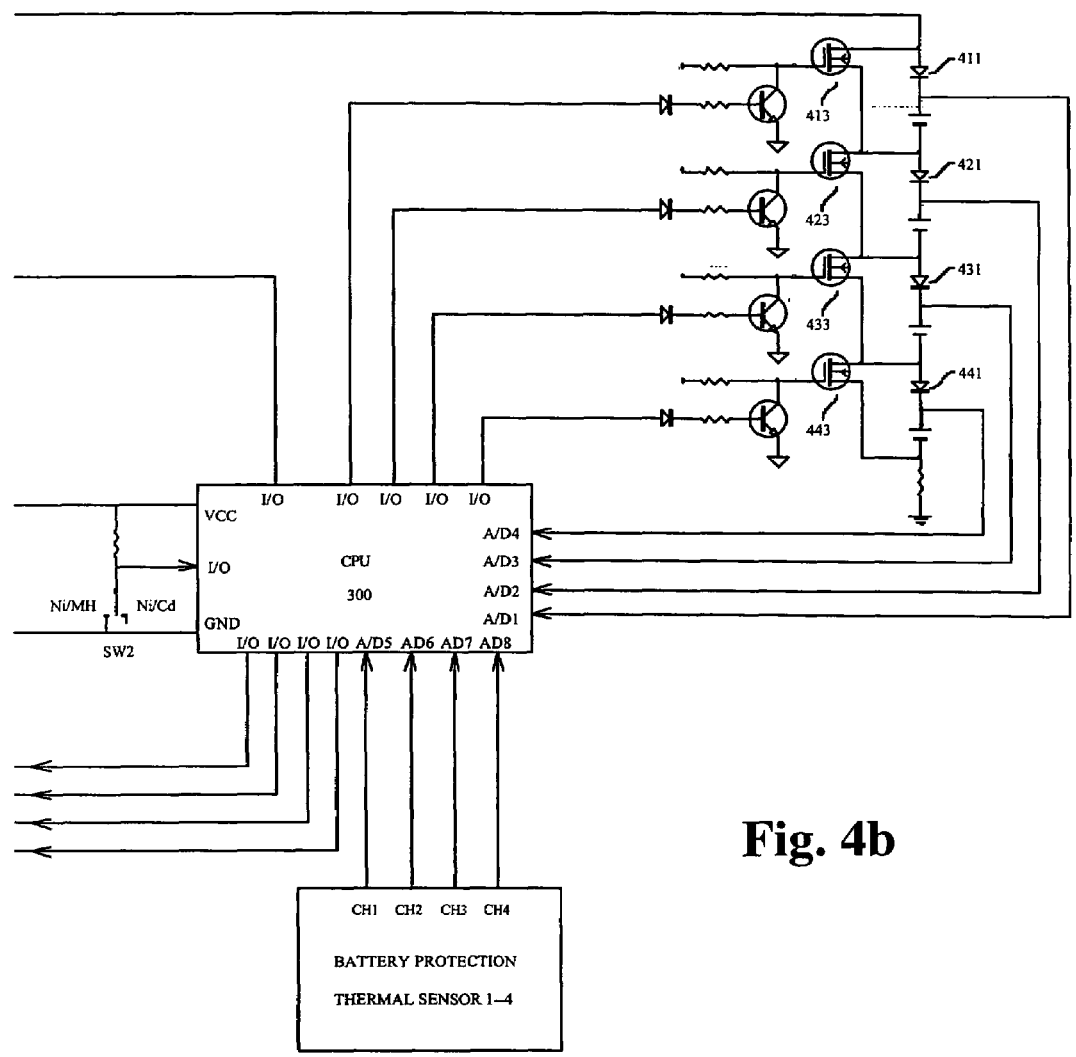

Referring to FIG. 4, there is shown in more detail the circuit arrangements of the battery charging sections of FIG. 3. In this specific embodiment, the connection of the bypassing switches (which are MOSFETs), the blocking diodes and the MOSFET gate controlling circuitry which is connected between the bypassing MOSFETs and the CPU, is described in more detail. This gate control circuitry is intended to provide only a working example of the control of the bypassing switch, many other circuit variations are of course possible to achieve substantially same or similar effects.

Figure 5:
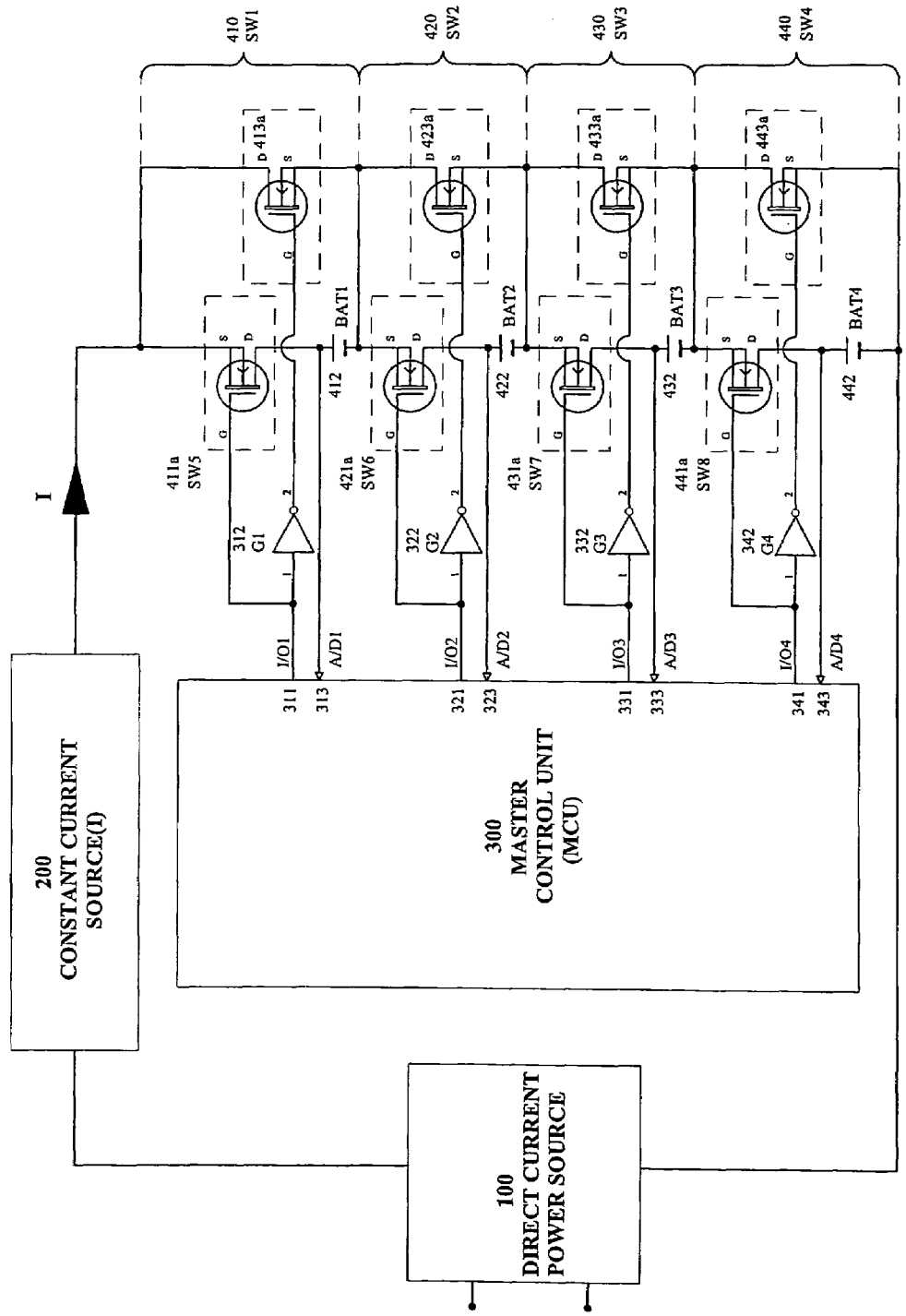
FIG. 5 is a hybrid block and circuit diagram showing a second preferred embodiment of a serial battery charger of the present invention.

FIGS. 1 and 5 show a hybrid block and circuit diagram of a second preferred embodiment of an example of the present invention of an intelligent serial battery charger. The battery charger comprises a direct current power source (100), a constant current source (200), a micro-controller unit (300) and a plurality of battery charging sections (410, 420, 430 and 440) connected in series. The serially connected battery charging sections are connected to the positive and negative terminals of the direct current power source (100) in order to obtain DC power of the correct polarity.

Referring to FIG. 5, each of the battery charging sections (410, 420, 430 and 440) comprises first and second parallel branches. The first parallel branch comprises an electronic controlled bypassing switch (413a, 423a, 433a, 443a). The second parallel comprises an electronic isolation means (411a, 421a, 431a, 441a) which is connected in series with the positive and negative terminals of the battery to control battery charging. The electronic controlled bypassing switch provides an alternative shunting path across the second parallel branch of a selected charging section when necessary, for example, when the battery in a particular charging section is fully charged, defective or overheated. More specifically, the bypassing switch provides a low-impedance shunting across the terminals of the serial connection of the electronic isolation means and the battery terminals when actuated. In the present specific embodiments, the bypassing switch is a three-terminal device in which the impedance across two of its terminals is controllable by a third terminal and the other two terminals are connected across the serial connection of the battery charging terminals and the electronic isolation means. Of course, other appropriate bypassing switches can be used.

Although the electronic isolation means (411a, 421a, 431a, 441a) in this preferred embodiments are a three-terminal device with the respective control terminals controlled directly by the control parts of the MCU, it will be appreciated that the same electronic characteristics set out above in respect of the electronic isolation means of the first embodiment apply.

In this second preferred embodiment as shown in FIG. 5, a field effect transistor (FET), such as a Metal-Oxide-Semiconductor-Field-Effect-Transistor (MOSFET), is used as an example of a suitable electronic isolation means for serial connection with the battery charging terminals of a battery charging section. The FET employed in this specific example is a N-channel enhancement mode field effect transistor (e.g., product Model No. CDM60ND02) with a switching bandwidth exceeding 1 MHz. The exemplary MOSFET is available from CET (Chino-Excel Technology Corporation) in a SO-8 package comprising two MOSFETS. The CDM60ND02 MOSFET includes a protection diode connected across the drain- and source-terminals, with the anode connected to the source and the cathode to the drain terminal of the MOSFET. As this second preferred embodiment is configured only as a charger, the MOSFET is configured as a one-way electronic device so that current is only allowed to flow along a single direction. Specifically, the one-way electronic device in this example is a 3-terminal device in which the impedance across two of its terminals (namely, the drain (D)- and the source(S)-terminals) is controllable by a third terminal, namely, the gate terminal G.

In the present specification, and unless the context otherwise requires, the term "one-way electronic means" is generally used to refer to a means or device which allows current flow in a single direction, whether such a unidirectional characteristic is inherent, for example, in the case of a diode or a triac, or non-inherent, for example, by appropriate configuration of a MOSFET. More particularly, it will be noted that the one-way electronic device is utilized in the present invention so that it allows charging current to flow into said battery but substantially prevents discharge of said battery through said one-way electronic device. Of course, the electronic isolation means can be configured as a two-way electronic device if the batteries are required to discharge while connected to the battery charger to behave as an energy source.

In this specific example and referring to the first battery charging section (410) as a convenient example, the source-terminal (S) and the drain-terminal (D) of the MOSFET (411a) are respectively connected to the higher and lower potential points of the battery charging section and upstream of the battery terminal contacts, so that charging current will flow from the source terminal into the battery (412) via the drain terminal of the MOSFET one-way electronic device (411a).

This connection topology is adapted to alleviate the risk of adverse battery current discharge through the protective diode when the one-way electronic device has been deactivated or turned off, since, otherwise, reverse current may flow out of the battery through the otherwise forwardly biased protective diode of the one-way electronic device 411 as terminal voltage of the battery at this instant may be dominant in the circuit loop comprising the protective diode and the bypassing switch. In this specific example, a MOSFET of the same type, namely, a N-channel enhancement mode MOSFET CDM60ND02, is used as a bypassing switch (413).

Furthermore, the control terminals of the bypassing switch (413) and the one-way electronic device (411) will connected to the same control port of the MCU (311) but with a logic inversion means (312), such as an invertor, connected to the control terminal of either the bypassing switch or the one-way electronic device. With this circuit arrangement 2 and, since the MOSFETs are of the same properties, when the one-way electronic device is activated or actuated, the bypassing switch will be deactivated or de-actuated and vice versa.

Turning to the operation of this serial battery charger, when a battery (412, 422, 432, 442) has been fully charged, is defective or is to be removed from the charging circuitry, the microcontroller will selectively activate a bypassing switch by sending a control signal to the control port (311, 321, 331, 341). In this specific embodiment, the control signal will be a "low"-logic signal appearing at the control port (311, 321, 331, 341) which will turn off or deactivate the one-way electronic device and at the same time turn on the bypassing switch.

When the bypassing switch (any one of 413a, 423a, 433a, 443a) has been activated, current originating from the constant current source will flow through the shunt branch containing the bypassing switch (the corresponding 413a, 423a, 433a, 443a) and then flow into the other charging sections or even possibly bypassing all batteries. At that time, the one-way electronic device of the battery charging section with an actuated bypassing switch will be turned into a high-impedance device which substantially isolates the battery or the battery charging terminals from the loop comprising the battery (or the battery charging terminals), the one-way electronic device and the bypassing switch, thereby alleviating the risk of current discharge from the battery into the bypassing switch or other battery charging sections of the battery chargers. Furthermore, as the protective diode of the MOSFET is connected with its cathode immediately adjacent the positive terminal of the battery, the protective diode will not be forward biased by the battery.

In order to continuously monitor the charging conditions of the batteries and, for example, to ensure that the electronic isolation means will be actuated to effect battery isolation as soon as the detected battery terminal voltage exceeds that of the charging section, the positive voltage terminals of the batteries are connected to the respective input A/D ports of the microcontroller with the microcontroller being programmed to monitor at short intervals the instantaneous voltage of the battery being charged. The voltage monitoring and/or measuring exercise is generally identical to that explained in respect of the first preferred embodiment, except that the control terminal of the electronic isolation means is also controlled by the MCU.

Similarly, when it is necessary to selectively isolate or remove a battery from the charging current, other batteries or other battery charging sections, the microcontroller (300) will send a bypassing activation signal to the control port (311, 321, 331, 341) to activate the respective bypassing switch (413, 423, 433, 443). When the bypassing switch has been selectively activated, the electronic isolation means will be actuated, thereby acting as a high impedance blocking means between the battery and the remaining portion of the circuit loop and thus protecting the battery as well as the remaining portion of the circuit or even the battery charger. Of course, batteries in any one of the charging sections (410, 420, 430, 440) can be selectively isolated by the selective activation of the bypassing switch for measurement of open circuit parameters or other electrical characteristics without loss of generality.

In order to ensure close and continuous tracking on the progress of battery charging with monitoring of the important battery parameters, the bypassing switches and the electronic isolation means are operated at a high frequency as described above. Since the SMPS of a battery charger is also typically operated by the MCU at a high-frequency and the bandwidth of the bypassing switches and the electronic isolation means are selected so that their operating bandwidth cover that high frequency, it will follow that the pair of bypassing switches and electronic isolation means will operate at a frequency comparable to that of the SMPS, that is, between 10 kHz and 100 kHz and preferably between 20-50 kHz.

Figure 6:
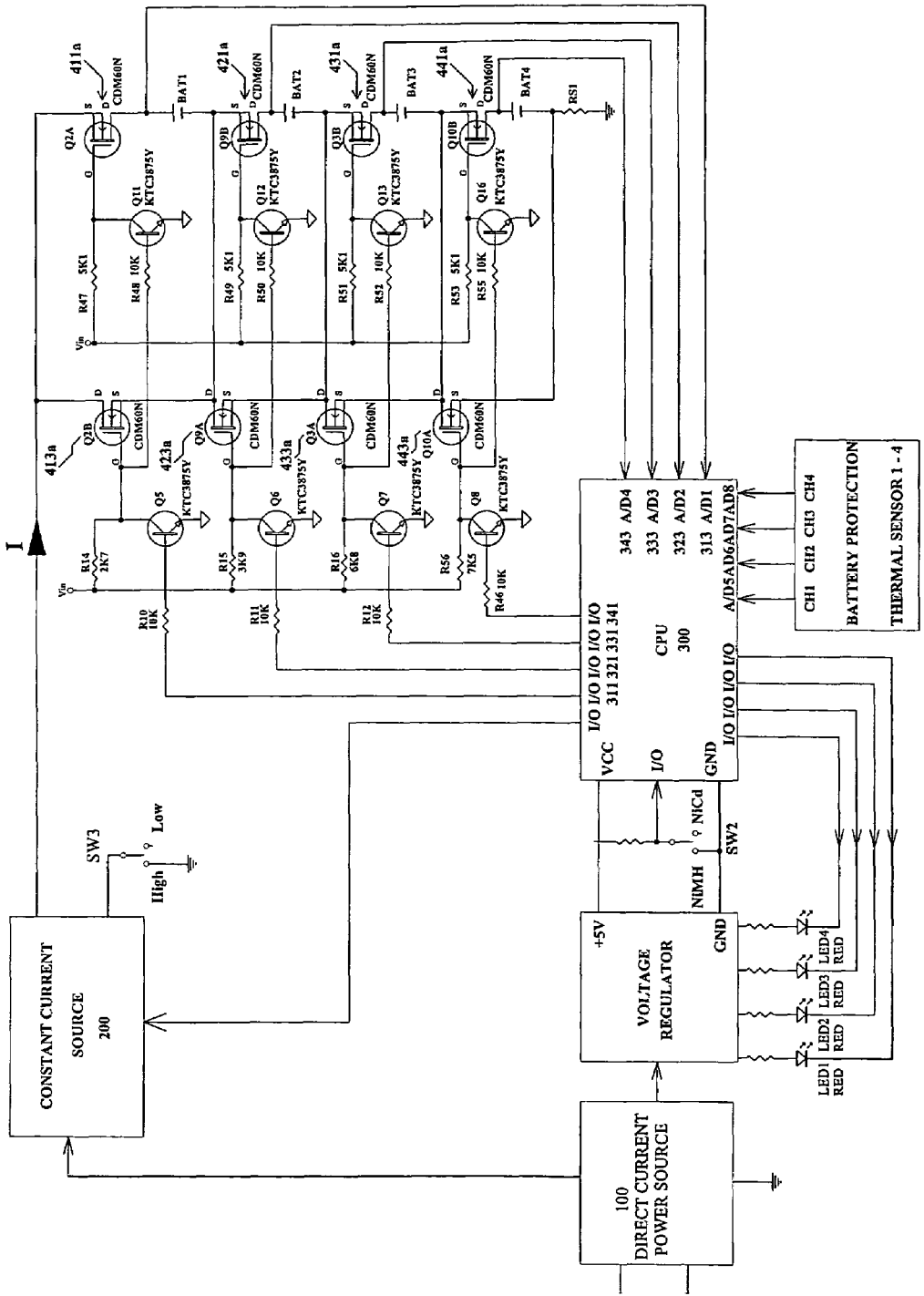
FIG. 6 is a hybrid block and circuit diagram showing a third preferred embodiment of a serial battery charger of the present invention.

Referring to FIG. 6, there is shown a third preferred embodiment of the present invention of a serial battery charger which is generally identical to the charger of FIG. 4 but with modifications made to the circuitry of the charging sections. The circuitry of the charging sections in this preferred embodiment is generally similar to that shown in FIG. 5, except that the invertor circuit is shown in more detail.

While diodes and MOSFETS have been used as examples to illustrate their application as an electronic isolation means or as an one-way electronic devices, it will be appreciated that other semiconductor devices, such as, for example, silicon controlled rectifiers (SCR), insulated gate bipolar transistors (IGBT), silicon controlled switches (SCS), bipolar transistors (BJT), opto-couplers, can also be used without loss of generality. Furthermore, while a MOSFET bypassing switch has been used as an illustrative example above, it would be appreciated by persons skilled in the art that other switching or semiconductor devices can also be used as appropriate bypassing switches or devices.

While the present invention has been explained by reference to the various specific examples described above, it should be appreciated that those examples are merely provided to assist understanding only and should not in any way be used to limit or restrict the scope of the present invention. In addition, it should be appreciated that the scope of the present invention shall be interpreted according to the spirit of the invention as described in the above description and should therefore cover modifications or variations which are obvious or trivial to persons skilled in the art. In particular, the present invention has disclosed a synergetic utilization of a combination of rather simple components to proffer a circuitry or circuit arrangements in which the various conflicting requirements for battery charging sections are accommodated and provided in a very simple way and by using relative simple components and in a simple arrangement.

The invention claimed is:

1. Control means for a serial battery charger, said serial battery charger comprising:
   a charging current source and a plurality of battery charging sections connected in series, each said battery charging section comprising first and second parallel branches,
   said first parallel branch comprising:
   a bypassing switch which forms a low impedance bypassing shunt across said second parallel branch when actuated,
   said second parallel branch comprising:
   an electronic isolation means connected in series with a pair of battery contact terminals for connecting a battery to said battery charging section for battery charging, said electronics isolation means when actuated substantially isolating said battery from said battery charging section, said electronic isolation means providing a low-impedance connection to said battery when de-actuated and a high-impedance connection to said battery when actuated, wherein said control means repetitively actuates the bypassing switches of said plurality of battery charging sections for battery voltage measurements when batteries connected to said battery charging sections are still under battery charging conditions.

2. Control means according to claim 1, wherein said control means repetitively actuates said bypassing switches of said battery charging sections at a high frequency for battery voltage measurements.

3. Control means according to claim 2, wherein said control means causes actuation of the bypassing switch of a battery charging section in order to isolate a battery from said battery charging section battery to terminate charging of said battery.

4. Control means according to claim 1, wherein said control means causes actuation of the bypassing switch of a battery charging section in order to isolate a battery from said battery charging section battery to terminate charging of said battery.

5. Control means according to claim 1, wherein said control means actuates the bypassing switches of all the battery charging sections downstream of a battery charging section when the voltage of a battery connected to said battery charging section is measured, the actuation of said downstream bypassing switches connects the negative terminal of said battery to the reference ground of said battery charger.

6. Control means according to claim 5, wherein said battery charger comprises voltage measuring means for measuring battery voltages, each said voltages measuring means is connected to the positive battery terminal of a battery charging section, wherein, upon actuation of the bypassing switches downstream of a selected battery charging section, the voltage appearing at said positive battery terminal of said battery charging section is the voltage of said battery with reference to the ground of said battery charger.

7. Control means according to claim 6, wherein the open-circuit voltage of a battery connected to a selected battery charging section is measured when the bypassing switch of said battery charging section has been actuated.

8. Control means according to claim 2, wherein said control means actuates the bypassing switches of all the battery charging sections downstream of a battery charging section when the voltage of a battery connected to said battery charging section is measured, the actuation of said downstream bypassing switches connects the negative terminal of said battery to the reference ground of said battery charger.

9. Control means according to claim 8, wherein said battery charger comprises voltage measuring means for measuring battery voltages, each said voltages measuring means is connected to the positive battery terminal of a battery charging section, wherein, upon actuation of the bypassing switches downstream to a battery charging the voltage appearing at said positive battery terminal of said battery charging section is the voltage of said battery with reference to the ground of said battery charger.

10. A serial battery charger comprising a control means according to claim 1.

11. A serial battery charger of claim 10, wherein said control means comprising a micro-controller.

12. A serial battery charger of claim 10, wherein said bypassing switches are MOSFETs.

13. A serial battery charger of claim 10, wherein said battery contacts of said second parallel branches are downstream of said isolation means and the negative battery contact terminal of a battery charging section is in common with the common node of the first and second parallel branches of the next downstream charging section.

14. A serial battery charger comprising a control means according to claim 2.

15. A serial battery charger comprising a control means according to claim 3.

16. A serial battery charger comprising a control means according to claim 4.

17. A serial battery charger comprising a control means according to claim 5.

18. A serial battery charger comprising a control means according to claim 6.

19. A serial battery charger comprising a control means according to claim 7.

20. A serial battery charger comprising a control means according to claim 8.

21. A method of monitoring and controlling the charging of batteries for a serial battery charger, said serial battery charger comprising a charging current source and a plurality of battery charging sections connected in series, each said battery charging section comprising first and second parallel branches, said first parallel branch comprising a bypassing switch which forms a low impedance bypassing shunt across said second parallel branch when actuated, said second parallel branch comprising an electronic isolation means connected in series with a pair of battery contact terminals for connecting a battery to said battery charging section for battery charging, said electronics isolation means when actuated substantially isolating said battery from said battery charging section, said electronic isolation means providing a low-impedance connection to said battery when de-actuated and a high-impedance connection to said battery when actuated, said method comprising the steps:

a) actuating the bypassing switches of said battery sections when batteries connected to said battery charging sections are still under battery charging conditions;

b) measuring the voltages of said batteries;

c) repeating steps a) and b) above until a battery is to be removed from the charging process; and d) isolating said battery from the said battery charging section to which said battery is connected and from the charging current source by actuating the bypassing switch of the battery charging section connected to said battery when the condition of said battery to be isolated fulfils a predetermined criterion.

22. A method according to claim 21, wherein steps a) and b) are repetitively performed at a high frequency.

23. A method according to claim 21, wherein steps a) and b) are repeated by actuating said bypassing switches at a frequency of about between 20-45 kHz.

24. A method according to claim 21, wherein said isolation means being upstream of said battery contact terminals, the method further comprising the step of actuating the bypassing switches of all battery charging sections downstream of a battery charging section in which the voltage of a battery connected to said battery charging section is being measured.

25. A method according to claim 24, wherein batteries connected to said downstream battery charging sections being electrically isolated from the charging current source upon actuation of said bypassing switches of said downstream battery charging sections, the actuation of said bypassing switches of said downstream battery charging sections simultaneously connecting the negative terminals of said batteries to the reference ground of said battery charger so that the voltage appearing at the positive terminals of the batteries connected to said downstream battery charging sections are the voltage of said batteries.

26. A charger with the monitoring and controlling method of claim 21.

27. A charger with the monitoring and controlling method of claim 22.

28. A charger with the monitoring and controlling method of claim 23.

29. A charger with the monitoring and controlling method of claim 24.

30. A charger with the monitoring and controlling method of claim 25.

* * * * *